Dec. 12, 1939.  J. R. BARNHART  2,183,180
MEASURING INSTRUMENT
Filed June 18, 1937  2 Sheets-Sheet 1
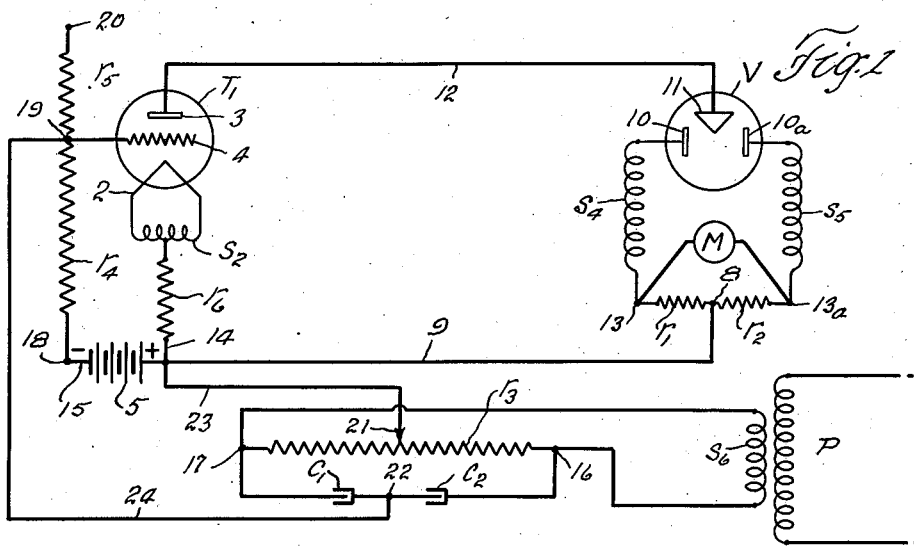
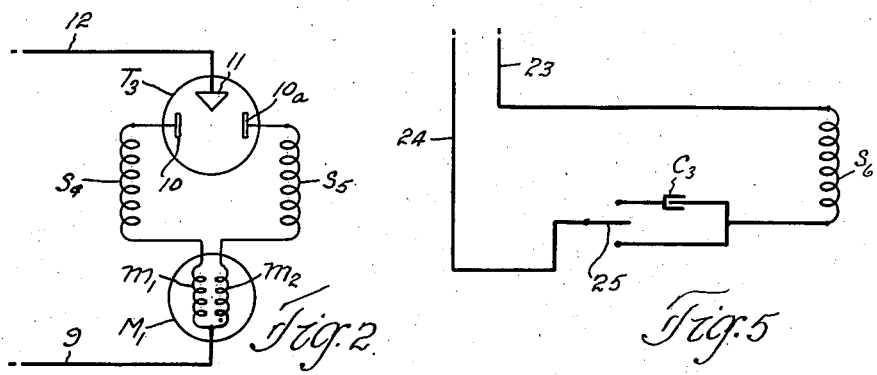
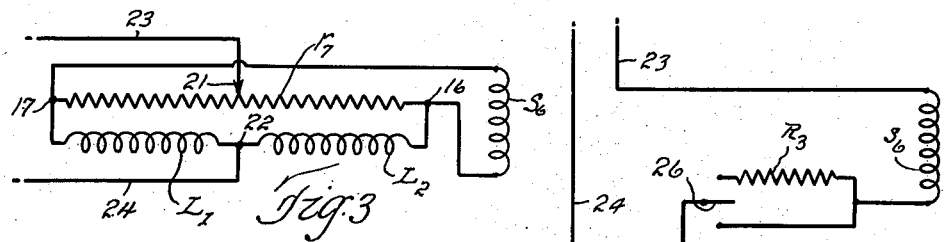
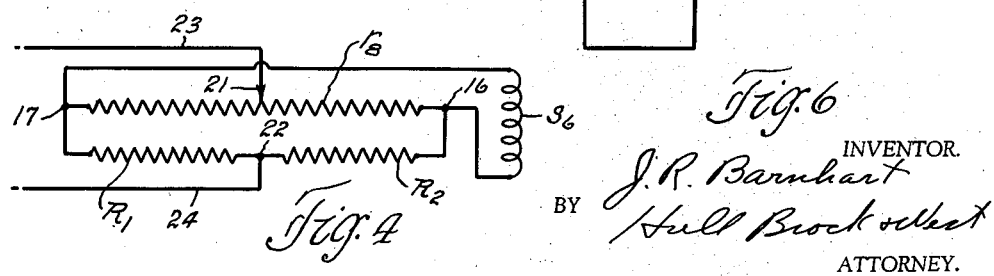
INVENTOR.
J. R. Barnhart
BY
ATTORNEY.

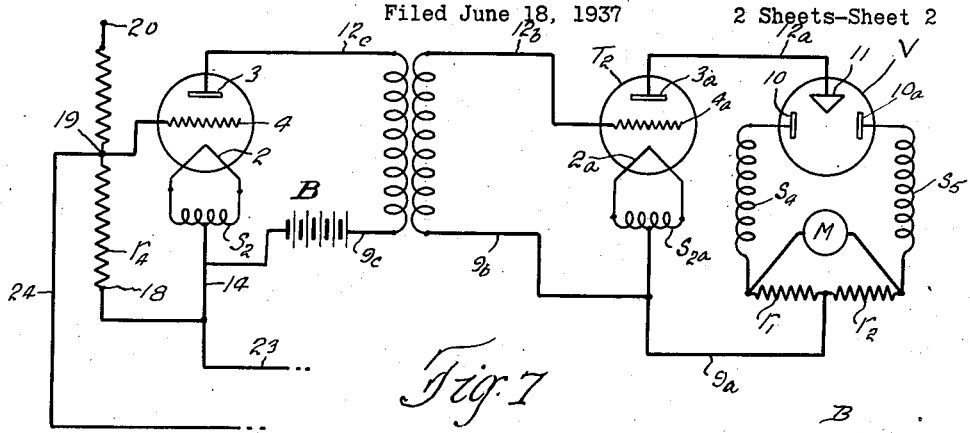
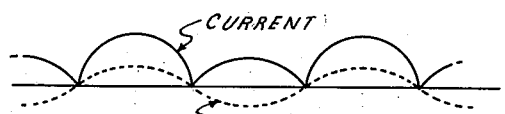
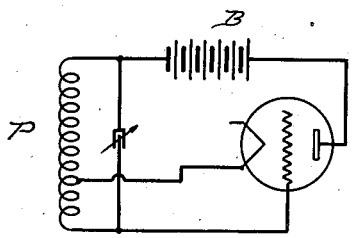
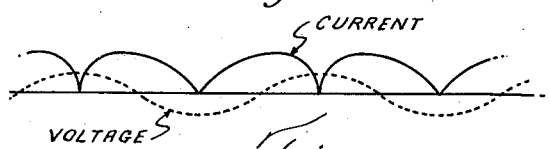
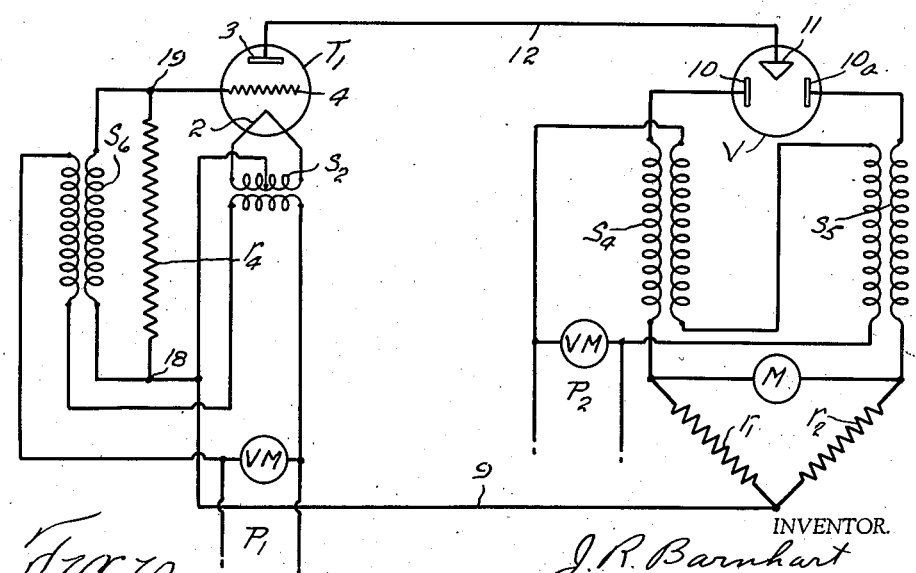

Patented Dec. 12, 1939

2,183,180

UNITED STATES PATENT OFFICE 2,183,180

MEASURING INSTRUMENT

Job R. Barnhart, Lakewood, Ohio

Application June 18, 1937, Serial No. 149,008

4 Claims. (Cl. 175—183)

This invention relates to an electrical measuring instrument particularly adapted for use with alternating current.

In my previous patent, No. 1,999,858, issued April 30, 1935, I disclosed in several variant forms a fundamental circuit for measuring mutual conductance in vacuum tubes. This circuit consisted basically in grid and plate circuits energized by secondary windings from the same transformer or equivalent sources of current in synchronism and in phase or equivalent pulsating currents, wherein the plate circuit was branched, each branch containing one of said secondary windings or the equivalent and a rectifier or equivalent means for causing alternating pulsations in the branches but all in the same direction, and a meter so connected as to indicate the difference in current in the two branches. The meter was of a type and so connected as to tend to swing in opposite directions responsive to the pulsations in the two branches but the moving coil had sufficient inertia to prevent apparent motion of the indicator. The meter being thus balanced with respect to an unbiased grid, or if desired, by suitable selection of windings in the branched plate circuit, being balanced with respect to a predetermined grid bias, the winding of known value inserted in the grid circuit would produce a predetermined change in grid potential which would augment the plate current in one branch of the plate circuit and diminish that in the other branch. The meter would indicate the difference between the current flowing in the two branches and, since the mutual conductance of a vacuum tube is the ratio of change in plate current to change in grid potential, would measure the mutual conductance.

It is thus clear that the tube was a temporary part of the organization. In the present invention, use is made of the same fundamental circuit in any or all its variant forms, but the tube is one of known characteristics with respect to which the meter may be calibrated so as to measure a potential impressed upon the grid. If such potential is an alternating one in synchronism and in phase with the pulsations in the plate circuit, it can well be used to measure a resistance, inductance or capacity so related to the grid circuit as to influence the grid potential. If such potential is out of synchronism or out of phase with the pulsations in the plate circuit, the meter will indicate that fact and can be arranged to measure the phase difference or even frequency difference, where the same is not too great, or as a harmonic analyzer where the frequency impressed upon the grid circuit is a multiple of that in the plate circuit.

Accordingly, the principal object of the present invention is to provide a measuring device for a class of purposes quite different from the measurement of mutual conductance, employing the fundamental circuit of my previous patent, in any or all its variant forms, shown by my said patent to be equivalent, as well as in other variant forms apparent to those skilled. in the art, but using the grid tube as a permanent part of the apparatus with respect to which the meter will be calibrated, rather than as the element to be tested, and making provision for impressing upon the grid a potential to be measured and which itself may be a measure of a characteristic of an instrumentality to be tested, or a measure of a phase or frequency relationship to be determined.

A more limited object is to provide an instrument adapted for attaining the principal object and providing for connecting an instrumentality to be tested or measured in a bridge circuit, supplied with suitable current as indicated and wherein leads from the grid circuit are connected in place of the usual galvanometer.

A further object is to provide an instrument capable of attaining the principal object and providing for energizing the plate circuit from one source of current and the grid circuit from another whereby such sources may be compared as to phase and frequency relationships.

Other objects will be in part apparent and in part pointed out hereinafter in connection with the accompanying drawings wherein Fig. 1 is a diagram showing the vacuum tube amplifying means and the connections for bridge measurements; Fig. 2 is a fragmentary diagram showing a variant form of branched plate circuit; Figs. 3 and 4 are fragmentary diagrams of forms of the invention using variant bridge circuits; Figs. 5 and 6 are fragmentary diagrams showing substitute arrangements for impressing a potential on the grid; Fig. 7 is a diagram similar to Fig. 1 but showing the insertion of one stage of amplification for greater sensitivity; Fig. 8 is a graph showing the plate current in $T_1$ and the voltage, using the connections of Fig. 1, when $S_6$ is in phase with $S_4$ and $S_5$; Fig. 9 is a similar graph showing the voltage and current when $S_6$ is 90° out of phase with $S_4$ and $S_5$; Fig. 10 is a diagram similar to Fig. 1 but showing the primary connections when the device is to be used as a synchroscope phase meter or harmonic analyzer:

and Fig. 11 is a diagram supplementary to Fig. 1 and showing means for energizing the winding P with high frequency current.

In order that my present invention may be fully understood without any reference to my prior patent, I will now describe the fundamental circuit as well as the changes necessary to adapt it to my present purposes, relying on my prior patent only for the purpose of helping persons skilled in the art to visualize some of the equivalent variants of the fundamental circuit disclosed therein.

Referring first to Fig. 1, it will be seen that I provide a tube $T_1$ having a filament 2, a plate 3 and a grid 4. The grid circuit is provided with the leak $r_4$ to render its operation stable. Biasing of the grid may be accomplished by inserting a resistance $r_6$ in the conductor, 14, or by inserting a suitable C battery 5 in the conductor 15, or both.

The meter, M, is of the ordinary moving coil or D'arsonval type which deflects in one direction for current of given polarity, and deflects in the opposite direction for current of opposite polarity. The terminals of the meter are connected through windings $S_4$ and $S_5$ to suitable rectifying means such as the anodes 10, 10a of the rectifying tube or valve, V, the cathode, 11, of which is connected by the conductor, 12, to the plate, 3, of the tube $T_1$. The winding, P, is the primary winding of a transformer which is to be connected to any suitable source of alternating current and which constitutes the energizing winding for all of the secondary windings, $S_2$, $S_4$, $S_5$, $S_6$, $S_7$. These secondary coils may or may not be wound on a common transformer core but, if not, suitable means must be provided for maintaining proper phase relation. The windings $S_4$ and $S_5$ are so formed as to produce equal voltages and are wound in such directions that in operation, when the anode, 10, is positive, the anode, 10a, is negative and vice versa. Resistances, $r_1$ and $r_2$, are assumed to be equal.

In operation, when the primary winding P of the transformer is energized by an alternating potential, the secondary $S_2$ becomes energized and heats the filament or cathode of the tube $T_1$, causing an emission of electrons. At the same time the windings $S_4$ and $S_5$ are energized and the anodes 10, 10a become alternately positive and negative. Considering first the half cycle during which the anode, 10, is positive, electronic current then flows from the cathode, 2, to the plate, 3, thence to cathode, 11, thence to anode 10, through winding $S_4$ to point 13, then dividing, part going through meter, M, and resistance, $r_2$, and the other part going through the resistance, $r_1$, to the point, 8, thence to the midpoint of the winding, $S_2$, if the tube, $T_1$, is of the filament type, or directly to the cathode, 2, if the tube is indirectly heated, thus completing the circuit. The current through the meter, M, flows from left to right causing a deflection of the pointer, say, to the left. Assuming that the resistance of the meter, M, is $R_m$, then the value of the current flowing through the meter, from Ohm's law, is (1) $\qquad I\left(\dfrac{r_1}{r_1+r_2+R_m}\right)$ Considering now the other half cycle, during which the anode 10a is positive, the electronic current flows from the cathode, 2, to the plate, 3, thence to the cathode 11, thence to anode 10a, thence through secondary $S_5$ to the point 13a, where the current divides as before, part flowing through the meter, M, from right to left and through resistance $r_1$, and the other part flowing through resistance $r_2$ to the point 8, and thence back to the cathode 2. In this instance the current flows through the meter from right to left, causing a deflection of the meter, say, to the right. Again the value of the current flowing through the meter, from Ohm's law, is (2) $\qquad I\left(\dfrac{r_2}{r_1+r_2+R_m}\right)$ Since $r_1$ and $r_2$ have been assumed to be equal, the two expressions (1) and (2) are equal and the deflection of the meter to the left is equal to the deflection to the right. Since the alternating potential supplied to the anodes 10, 10a, are rapid in the case of commercial alternating supply lines, the inertia of the moving part of meter, M, prevents such part from following the alternating impulses. To the eye, therefore, the pointer of the meter will appear to stand still. Therefore, since $r_1$ and $r_2$ are equal when the grid of the tube, $T_1$, is not subjected to signaling effect, the meter, M, will remain at rest without sensible movement of its moving element.

Let us now assume that an alternating potential exists across $r_4$ in synchronism and in phase with the potential in $S_4$ and $S_5$. Let us further assume that at the moment that the anode 10 is positive, the point 19 of $r_4$ is positive, then while current is flowing through anode 10, winding $S_4$, and from left to right in the meter, M, the grid, 4, is positive with respect to the cathode, 2. The current, in this case, will be greater than in the case before described where the signaling effect was omitted from the grid circuit. The current through the meter is now (3) $\qquad (I+\Delta I)\left(\dfrac{r_1}{r_1+r_2+R_m}\right)$ Likewise when the anode, 10a, is positive, the point 19 of $r_4$ is negative. Therefore when current flows through 10a, $S_5$, and from right to left through the meter, M, it is less than in the first described case. The current through the meter is now (4) $\qquad (I-\Delta I)\left(\dfrac{r_2}{r_1+r_2+R_m}\right)$ For convenience let $$\left(\dfrac{r_2}{r_1+r_2+R_m}\right)=h$$

The difference between (3) and (4) then is (5) $\qquad (I+\Delta I)h-(I-\Delta I)h=2\Delta Ih$ Unbalancing of the two currents in opposite directions through the meter causes a sensible deflection of the pointer and such deflection is proportional to the difference between the currents in opposite directions, or to $\Delta I$.

In my prior patent, I showed how the above is taken advantage of to measure the mutual conductance of the tube $T_1$. In the present case, I am not concerned with the measurement of mutual conductance or any property of the tube $T_1$ but use such tube as a permanent part of the device and adjust other values with respect to the properties of the tube. The tube $T_1$ may, of course, be replaced periodically by another tube of the same kind and for some purposes, as where only qualitative indication is required, tubes of different properties may be used without change in calibration.

In the circuit of Fig. 1, the network 16, $r_3$, 17, $C_1$, $C_2$ represents the conventional electrical bridge, energy being supplied from the winding $S_6$ to the points 16, 17. This energy is synchronous and in the phase with the energy in windings $S_4$ and $S_5$. If the bridge is balanced, the points 21 and 22 are at equal potential and the grid, 4, of the tube, $T_1$, is not subjected to signaling effect and the pointer of the meter, M, remains stationary. If the slider, 21, is moved to the right, current will flow through the leak, $r_4$, say, from 21 to 22. During a given half cycle with 21 moved to the right, the point 19, and grid 4, are positive. The meter pointer will be deflected to one side of its zero mark. During the same half cycle, if the point 21 were moveu to the left of the balance point, the meter pointer would be deflected in the opposite direction because the grid, 4, would then be negative.

It is thus obvious that my device can be used as a balance indicator in bridge measurements. In Fig. 1, the condenser $C_1$ may be any standard of capacitance and the value of $C_2$ can be read on a calibrated scale associated with the movable point 21. The condenser $C_1$ may be replaced with a standard of resistance. In this case $C_2$ will be replaced with an unknown resistance to be measured. Likewise inductances $L_1$ and $L_2$ or resistances $R_1$ and $R_2$ may be substituted, as indicated in Figs. 3 and 4.

If the tube, $T_1$, is selected having a straight $i_p$, $e_g$ characteristic, the deflection of the meter, M, is proportional to the A. C. voltage across $r_4$. Even if the curve is not straight, with a given tube, $T_1$, the meter can be calibrated to read directly in volts across $r_4$.

By means of a multiplier, $r_5$, potentials of any magnitude in phase with $S_4$, $S_5$ can be measured by applying the same to the points 18 and 20. The impedance $r_5$ plus $r_4$ can be made very great thus adapting this device to uses where the ordinary means of measurement are unsuited because of relatively low impedance.

If still greater sensitivity is desired, an amplifying tube $T_2$ can be connected between $r_4$ and $T_1$ as shown in Fig. 7, the plate 3 being energized by a battery B connected in series in the plate circuit of the tube T.

It is to be understood that windings $S_4$ and $S_5$ need not in all cases be equal, since the winding $S_6$ may be connected in the grid circuit as in Figs. 5 and 6, in which case the windings $S_4$ and $S_5$ can be made unequal and of such value as to balance the meter when the instrumentality being tested, such as a condenser $C_3$ or a resistance $R_3$ to be measured, is disconnected by opening of the switches 25 or 26, whereby when such switches are closed the deflection of the meter will indicate the characteristic to be measured.

It is thus seen that several ways are available for impressing upon the grid circuit a potential characteristic of a property of an instrumentality to be measured. In all cases the meter can be calibrated with respect to the various elements of the complete circuit. Where a plurality of circuits are to be used interchangeably or a plurality of types of instrumentalities are to be measured by use of the same circuit, the meter may have a plurality of scales or tables may be provided for interpreting the meter reading in each case.

Fig. 8 is a graphic representation of the current in plate, 3, of the tube, $T_1$, in Fig. 1 together with the voltage across $r_4$ when same is in phase with $S_4$ and $S_5$.

In Fig. 9 is shown a graphic representation of the current in Plate 3, together with the voltage across $r_4$ when same is 90 degrees out of phase with $S_4$ and $S_5$. In Fig. 9 the plate current waves are seen to be distorted, but the alternate waves are of the same height and in contrafacsimile; therefore the meter, M, will not deflect. For intermediate phase relations between 0 and 90 degrees the meter response is substantially proportional to the cosine of the phase angle.

Now, if in Fig. 10, $S_4$ and $S_5$ are energized from a given generator, through $P_2$, and $r_4$ or $S_6$ is energized from a second generator, through $P_1$ which it is desired to bring into synchronism and phase with the first generator, when the two generators approach synchronism, the pointer of the meter, M, will swing back and forth, more and more slowly as the machines approach more and more closely to synchronism. When synchronism and proper phase has been reached, the pointer of the meter will reach maximum on one side and remain stationary. The position of the pointer for desired phase relation being determined when the device is manufactured.

When it is desired to use the device as a harmonic analyzer, there may be impressed upon the grid circuit, as at $P_1$ in Fig. 10, a current having a frequency which is approximately a multiple or a submultiple of that in $P_2$. When such currents are so applied, there will be a resultant effect on the meter characteristic of the harmonic to be analyzed. It is contemplated that the characteristics of the potential applied to $P_2$ will be accurately known and preferably that it will be of pure sine form; also that means will be provided for varying the frequency slowly to an accurately known extent between rather narrow limits. If, for example, the potential applied across $P_1$ is about 120 cycles, and the standard potential applied across $P_2$ is 60 cycles, such standard potential should be variable from say 58 to 62 cycles. Then, if the potential across $P_1$ should prove to be actually 120 cycles, the pointer of the meter would fluctuate more and more slowly as the standard potential aproached 60 cycles from above or below, coming to rest at 60 cycles exactly and at a point indicative of the harmonic being measured. Variability of the potential across $P_2$ may be effected in any suitable manner as by a variable speed generator or an oscillator having a variable element as indicated in Fig. 11.

This device is suitable for use with currents of any frequency. It is sometimes desirable to measure capacity, resistance and inductance at frequencies higher than supplied by ordinary generators. In such case the primary P of Fig. 1 may be energized by an oscillator as indicated in the fragmentary diagram of Fig. 11.

Instead of connecting the meter in shunt relation with the resistances $r_1$ and $r_2$, $S_4$ and $S_5$ can be connected respectively to two differential windings $m_1$ and $m_2$ on a common moving element of the meter, M, as shown in Fig. 2.

Having thus described my invention, what I claim is:

1. An electrical measuring instrument comprising, in combination, a vacuum tube having a grid, means for impressing upon said grid an alternating potential, and a plate circuit comprising branches in parallel relation, each branch containing means for producing pulsations alternating in said branches but all in the same direction, a meter and means connecting the same in such relation to said branches as to be affected by both but in opposite directions whereby to be responsive to the difference in magnitude between the currents in said branches, said first mentioned means including means for changing the phase angle between the grid potential and the plate circuit voltage.

2. In apparatus for the purpose described, a tube having cathode, plate and grid, means providing a plate circuit for said tube, means cooperating with an instrumentality to be measured to provide a grid circuit for said tube and to impress an alternating potential on said grid circuit, said plate circuit including a pair of branches in parallel relation, means for energizing said branches to provide periodic pulsations in each, with pulsations in the same direction alternating in said branches and a meter associated with said branches by interconnection therebetween to be responsive to the difference in magnitude of pulsations therein caused by alternations of the potential in said grid circuit, and said second mentioned means including means for changing the phase angle between the grid potential and the plate circuit voltage.

3. A measuring device comprising, in combination, tube means including a branched plate circuit, each branch containing a resistor, a source of alternating current and a rectifying valve in series, said sources being arranged to cause current to flow in the same direction in said branches but during different halves of the cycle, and a meter associated with said branched circuit and adapted to measure the difference in magnitude between the currents in the two said branches; means for energizing said tube; a third source of alternating current and means cooperating therewith and with an instrumentality whose characteristic is to be measured for impressing upon said grid a potential indicative of such characteristic, and said last means including means for changing the phase angle between the grid potential and the plate circuit voltage.

4. In apparatus for the purpose described, a tube having cathode, plate and grid, means providing a plate circuit for said tube, means cooperating with an instrumentality to be measured to provide a grid circuit for said tube, said plate circuit including a pair of branches in parallel relation, means for energizing said circuits to provide periodic pulsations in each, with pulsations in the same direction alternating in said branches, and a meter associated with said branches and responsive to the difference in magnitude of pulsations therein caused by those in said grid circuit, said second mentioned means including an incomplete bridge circuit, to be completed by the instrumentality to be measured and said second mentioned means including means for changing the phase angle between grid potential and the plate circuit voltage.

JOB R. BARNHART.